US009630732B2

(12) United States Patent
Hodler

(10) Patent No.: US 9,630,732 B2
(45) Date of Patent: Apr. 25, 2017

(54) APPARATUS AND METHOD FOR MANUFACTURING FILTERS AND INSERTING THE FILTERS INTO SINGLE DOSE CAPSULES FOR PREPARING BEVERAGES

(75) Inventor: Rolf Hodler, Latterbach (CH)

(73) Assignee: RYCHIGER AG, Steffisburg (CH)

( * ) Notice: Subject to any disclaimer, the term of this patent is extended or adjusted under 35 U.S.C. 154(b) by 122 days.

(21) Appl. No.: 14/382,739

(22) PCT Filed: Mar. 15, 2012

(86) PCT No.: PCT/CH2012/000060
§ 371 (c)(1),
(2), (4) Date: Sep. 3, 2014

(87) PCT Pub. No.: WO2013/134885
PCT Pub. Date: Sep. 19, 2013

(65) Prior Publication Data
US 2015/0020481 A1    Jan. 22, 2015

(51) Int. Cl.
*B65B 65/00*   (2006.01)
*B65B 47/00*   (2006.01)
(Continued)

(52) U.S. Cl.
CPC .......... *B65B 65/006* (2013.01); *B01D 27/005* (2013.01); *B23P 21/004* (2013.01);
(Continued)

(58) Field of Classification Search
CPC  B01D 23/005; B01D 27/005; B01D 29/0093; B65B 1/02; B65B 3/02;
(Continued)

(56) References Cited

U.S. PATENT DOCUMENTS 3,385,025 A * 5/1968 Lemelson ................. B65B 3/02
                                                53/453
3,415,036 A   12/1968 Beckers
(Continued)

FOREIGN PATENT DOCUMENTS

DE        1 511 620 A1   9/1969
DE   10 2008 029 471 A1  2/2009
(Continued)

OTHER PUBLICATIONS

Japanese Office Action mailed Oct. 26, 2015 issued in Japanese Application No. 2014-561244—English Translation.

*Primary Examiner* — Essama Omgba
*Assistant Examiner* — Matthew P Travers
(74) *Attorney, Agent, or Firm* — Birch, Stewart, Kolasch & Birch, LLP

(57) ABSTRACT

An apparatus for manufacturing filters and inserting the filters into single dose capsules for preparing beverages comprises a punching and forming device for punching material portions from a sheet material and forming the material portions to assume the form of a beaker-shaped filters, an insertion device arranged in a distance of the punching and forming device along a work flow direction for inserting the formed filters into the capsules, a first transport device (175, 176) for accepting a plurality of formed filters from the punching and forming device and transporting the accepted filters to the insertion device, a second transport device (177) for accepting a plurality of formed filters from the punching and forming device and transporting the accepted filters to the insertion device. The first transport device (175, 176) and the second transport device (177) are movable with respect to each other.

9 Claims, 7 Drawing Sheets

(51) Int. Cl.
  *B23P 21/00* (2006.01)
  *B01D 27/00* (2006.01)
  *B65B 43/48* (2006.01)
  *B21D 22/21* (2006.01)
  *B21D 22/02* (2006.01)
  *B21D 35/00* (2006.01)
  *B65B 29/02* (2006.01)

(52) U.S. Cl.
  CPC .............. *B65B 29/02* (2013.01); *B65B 43/48* (2013.01); *B65B 47/00* (2013.01); *B21D 22/02* (2013.01); *B21D 22/21* (2013.01); *B21D 35/003* (2013.01); *Y10T 29/49604* (2015.01)

(58) Field of Classification Search
  CPC ......... B65B 5/024; B65B 29/02; B65B 47/00; B65B 61/065; B65B 43/08; B65B 43/48; B65B 65/006; B21D 43/003; B21D 51/10; B21D 51/12; B21D 51/18; B21D 35/001; B21D 35/003; B21D 24/16; B21D 22/02; B21D 22/06; B21D 22/21; B65D 85/816; B23B 11/00; B23P 21/00; B23P 21/004; Y10T 29/49604; Y10T 29/53322
  See application file for complete search history.

(56) References Cited

U.S. PATENT DOCUMENTS

| | | | |
|---|---|---|---|
| 6,440,256 B1* | 8/2002 | Gordon | A47J 31/08 156/201 |
| 6,684,604 B2* | 2/2004 | Luc | B65B 7/2807 53/244 |
| 7,559,185 B2* | 7/2009 | Conti | B65B 9/04 53/453 |
| 7,910,145 B2* | 3/2011 | Reati | B26F 1/40 426/425 |
| 2008/0314256 A1 | 12/2008 | Smith | |
| 2009/0211713 A1 | 8/2009 | Binacchi | |
| 2012/0269933 A1* | 10/2012 | Rapparini | B65D 85/8043 426/82 |

FOREIGN PATENT DOCUMENTS

| | | |
|---|---|---|
| EP | 2 093 148 A1 | 8/2009 |
| EP | 2 412 645 A1 | 2/2012 |
| JP | 2009-101129 A | 5/2009 |
| WO | WO 2010/007633 A1 | 1/2010 |

* cited by examiner

APPARATUS AND METHOD FOR MANUFACTURING FILTERS AND INSERTING THE FILTERS INTO SINGLE DOSE CAPSULES FOR PREPARING BEVERAGES

TECHNICAL FIELD

The invention relates to an apparatus for manufacturing filters and inserting the filters into single dose capsules for preparing beverages. It further relates to a method of manufacturing filters and inserting the filters into single dose capsules for preparing beverages.

BACKGROUND ART

Single dose capsules for preparing beverages are known. They comprise a certain portion of a substance that is used for preparing the beverage, such as coffee, tea or cocoa. The substance may be present in particular in powder or granulate form. In certain kinds of the single dose capsules the substance is held within a beaker-shaped filter, where the filter is formed in such a way that it forms a volume for accommodating the substance. In particular, single dose capsules for preparing drip coffee are known, comprising a beaker-shaped shell, a beaker-shaped filter arranged within the shell and attached to the shell at least along its upper rim and a cover sealed to the shell sealingly closing the capsule.

Several apparatuses and methods for manufacturing the beaker-shaped filter and inserting the filter into the capsule are known.

For example, EP 2 093 148 B1 (Opem S.p.A.) relates to a plant for manufacturing single-dose capsules for preparing beverages, comprising a conveyor for advancing the shells in succession along a production line. The plant further comprising at least a single forming and inserting device for forming individual beaker-shaped filters of filtering material and for releasing each of the beaker-shaped filters inside an impermeable shell, means for adjusting the level of each beaker-shaped filter inside the shell, and welding means for welding the upper rim of the filters to the upper edge of the shells.

The device is of a rather complicated construction and requires considerable space in a direction perpendicular to the work flow direction of the device.

DE 10 2008 029 471 A1 (Packaging Technologies) discloses a method and device for feeding a filter to a capsule. The filter is fed with high speed to a position which is defined by a hard stop. Subsequently, it is precisely positioned and finally fed to the capsule. The high speed feeding may be accomplished by employing a stream of air, feeding to the capsule may be effected using a holder and a pusher.

This device requires the feeding of formed filters from a filter forming station to the line where the filters are inserted and attached to the capsules. This causes an increased footprint of the entire plant and requires rather complicated means for handling the formed filters.

SUMMARY OF THE INVENTION

It is the object of the invention to create an apparatus and a method for manufacturing filters and inserting the filters into single dose capsules for preparing beverages that has a small footprint, is of simple construction and allows for high throughput.

The solution of the invention is specified by the features of the claims. According to the invention, an apparatus for manufacturing filters and inserting the filters into single dose capsules for preparing beverages comprises:

a) a punching and forming device for punching material portions from a sheet material and forming the material portions to assume the form of beaker-shaped filters;
b) an insertion device arranged in a distance of the punching and forming device along a work flow direction for inserting the formed filters into the capsules;
c) a first transport device for accepting a plurality of formed filters from the punching and forming device and transporting the accepted filters to the insertion device;
d) a second transport device for accepting a plurality of formed filters from the punching and forming device and transporting the accepted filters to the insertion device;
whereas
e) the first transport device and the second transport device are movable with respect to each other.

Employing separate devices for punching and form on one hand and for inserting on the other hand allows for achieving higher throughput compared to systems where punching, forming and inserting is accomplished by a single device, usually along a single work axis. Using two transport devices that are movable with respect to each other allows for increased flexibility when feeding a plurality of filters of the punching and forming device to the insertion device.

A corresponding method of manufacturing filters and inserting the filters into capsules for preparing beverages comprises the steps of:

a) in a first device punching material portions from a sheet material and forming the material portions to assume the form of beaker-shaped filters;
b) transporting the formed filters from the first device to a second device, along a work flow direction;
c) in the second device inserting the formed filters into the capsules;
whereas
d) a distance of neighbouring formed filters is reduced when transporting the formed filters from the first device to the second device.

Due to the fact that the filters are beaker-shaped the material portions punched from the sheet material have a footprint that is considerably larger than that of the formed filter or the capsule. Despite that, reducing the distance after punching and forming allows for inserting the formed filters into capsules which are fed to the insertion device in a compact configuration such as successive rows of closely spaced capsules. Accordingly, the geometry of the preceding and subsequent processing stations, e. g. for forming the capsules, sealing the filters or filling and sealing the capsules may have a compact geometry despite the enhanced space requirements of the punching and forming device.

Preferably, the punching and forming device comprises a plurality of punching and forming tools, the work positions of neighbouring punching and forming tools being arranged in a first distance to each other. The insertion device comprises a plurality of insertion tools, the work positions of neighbouring insertion tools being arranged in a second distance to each other, whereas the second distance is smaller than the first distance.

The term "work position" relates to a specific geometric point of the punching/forming tool and the insertion tool, respectively, e. g. to the center of a circular tool. Therefore, the distance mentioned before does not relate to the distance between outer contours of the tools but to the distance of these specific geometric points of the tools. The lines connecting these geometric points of neighbouring tools may have any direction, i. e. axial (parallel to the work flow direction) or transversal (perpendicular to the work flow direction) or angled to these directions. In particular, these lines do not have to have the same direction with respect to the punching and forming tools and the insertion tools, respectively.

This allows to take into account different space requirements for the different tools (punching and forming compared to insertion) and/or for the material portion and the beaker shaped filter, without having to prepare the filters off line and feeding them to the production line. In particular, the space requirements for the punching and forming tools will not dictate the arrangement of the insertion tools. This allows for reducing the overall width of the insertion device and possibly further devices arranged downstream of the insertion device (such as for sealing the filter to the capsule, filling the filter and/or sealing a cover to the capsule).

In a preferred embodiment, the work positions of the plurality of punching and forming tools are arranged along two straight lines, the lines being spaced with respect to the work flow direction, whereas the work positions of the punching and forming tools are alternately arranged on a first and on a second of the two lines. The work positions of the plurality of insertion tools are arranged along a straight line, an insertion tool assigned to each of the punching and forming tools, the work position of the assigned insertion tool being arranged in the work flow direction with respect to the work position of the respective punching and forming tool. Therefore, the two transport devices that are movable with respect to each other allow for transferring the filters, punched and formed by tools arranged alternately along two lines to insertion tools which are arranged on a single line. In particular, the lines are oriented perpendicular to the work flow direction. More than two lines of punching and forming stations may be present, especially if necessary due to the space requirements of the punching and forming tools.

Accordingly, the filters are punched and formed in positions arranged along two straight lines, the lines being spaced with respect to the work flow direction. Then, the formed filters are brought to assume positions along a single straight line when transporting the formed filters from the first device to the second device.

Advantageously, the first transport device and the second transport device each comprise a plurality of seats for the acceptance of a formed filter each, whereas the seats of the first transport device and the seats of the second transport device are offset to each other along a line perpendicular to the work flow direction. Thereby, filters formed by the tools arranged on a first of the two lines may be accepted by the first transport device, whereas filters formed by the tools arranged on the second of the two lines are accepted by the second transport device. Moving the two transport devices with respect to each other, along the work flow direction, will then bring the filters into a single row perpendicular to the work flow direction.

Preferably, the seats of the first transport device and the seats of the second transport device are arranged in portions of transport elements that may be brought into a teethed relationship. This means that in a position in which the transport devices are brought together, portions of the first transport device as well as of the second transport device featuring the seats alternately follow each other along a line perpendicular to the work flow direction.

It is even more preferable if the transport elements of the first transport device and the second transport device are formed such that they may be brought into the teethed relationship such that the seats are arranged along a straight line. Being able to position the filters to be inserted into the capsules along a straight line greatly simplifies the insertion. In particular, all the capsules to be provided with filters may be fed in parallel lines oriented perpendicular to the work flow direction.

Alternatively, the seats are brought closer together to a final position where the neighbouring seats are still in a staggered arrangement.

In a preferred embodiment, the apparatus comprises two insertion devices, one of the insertion devices being arranged upstream of the punching and forming device along the work flow direction, the other of the insertion devices being arranged downstream of the punching and forming device along the work flow direction. Accordingly, the formed filters of subsequent punching and forming cycles are alternately transported downstream to the second device for inserting the formed filters into the capsules and upstream to the first device for inserting the formed filters into the capsules.

This allows for alternately use the first and the second insertion device. It is not required to wait for completion of the insertion before the other insertion device may be loaded with filters, which allows for higher production speeds.

In this connection, it is especially advantageous to have a third transport device which is movable with respect to at least one of the first and second transport devices. The third transport device may alternately cooperate with the first and the second transport device, respectively. Preferably, the third transport device comprises a number of seats for cooperating with the first transport device and a number of further seats cooperating with the second transport device. Thereby, separate seats are provided for the filters formed in two subsequent forming cycles. Accordingly, filters may already be fed to the corresponding seats even if insertion of the filters held in the other seats has not yet been finished.

Alternatively, the two transport devices are arranged to both cooperate with both insertion devices.

In a preferred embodiment, the first and the third transport device are fixedly attached to a base, whereas the base is movable in the work flow direction. The second transport device is mounted on the base, movable with respect to the base and in a position between the first and third transport device with respect to the work flow direction. This allows for a simple construction and efficient operation. Suitably combining the movements of the base as well as of the second transport device allows for selectively cooperating with the punching and forming device as well as with the insertion devices.

Preferably, the punching and forming device comprises a punching tool being movable in a punching and forming direction and a plunger coaxially arranged in the center of the punching tool, being movable in the punching and forming direction with respect to the punching tool.

In particular, a forming tool is arranged downstream of the punching tool in the punching and forming direction, whereas the plunger forces the punched material portion through the forming tool, thereby forming the material portion to assume the form of a beaker-shaped filter, whereas the plunger further transports the formed filter into one of the transport devices.

Accordingly, the punching and forming of a filter is effected along a straight line, and the formed filter is transported into a seat of a transport device arranged along the straight line. This allows for a simple and compact construction and provides for high throughput.

Other advantageous embodiments and combinations of features come out from the detailed description below and the totality of the claims.

BRIEF DESCRIPTION OF THE DRAWINGS

The drawings used to explain the embodiments show.

In the figures, the same components are given the same reference symbols.

Preferred Embodiments

Figure 1A:
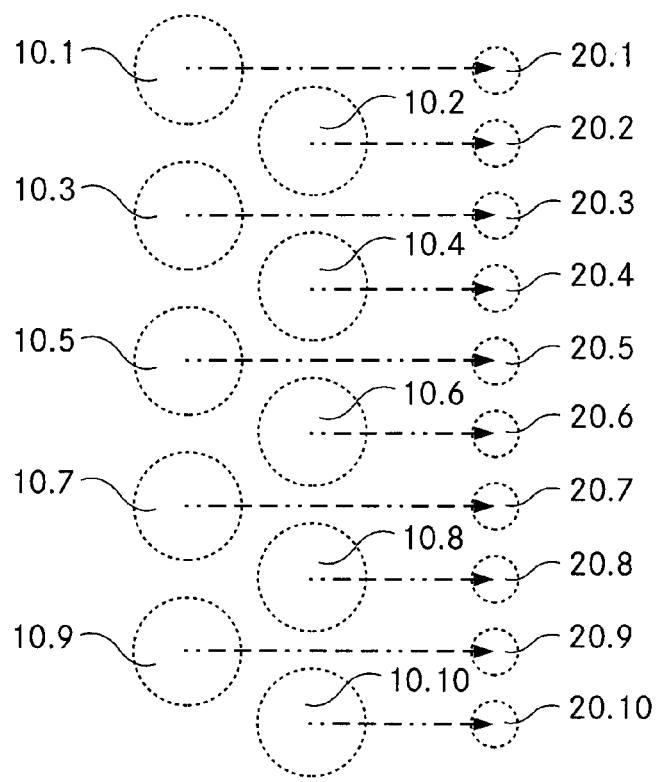
FIG. 1A, B The main principle of two variants of the inventive apparatus and method.
Figure 1B:
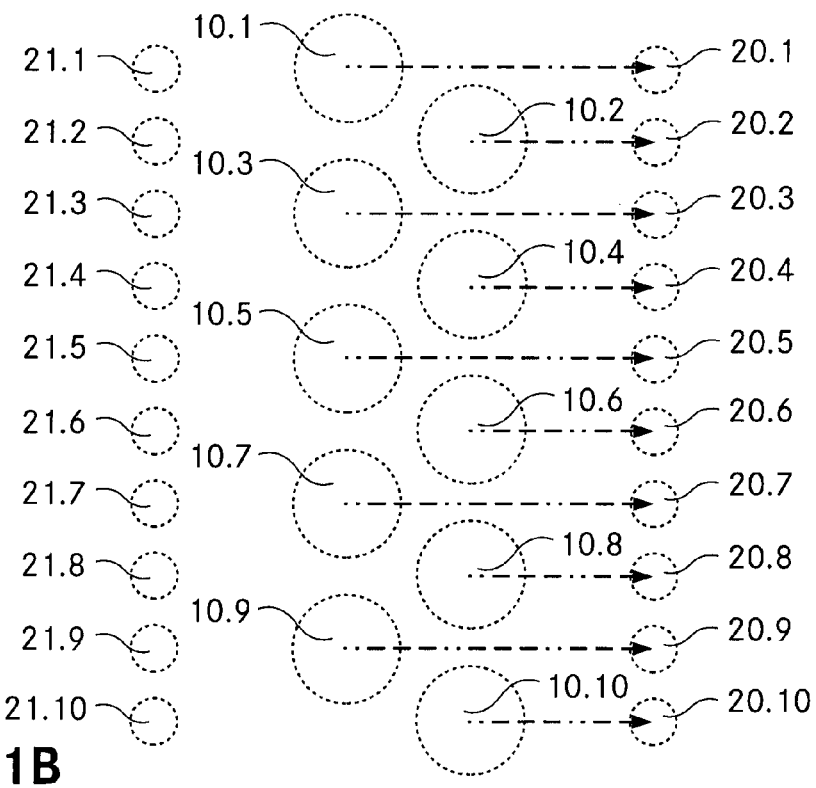

The FIGS. 1A, 1B show the main principle of two variants of the inventive apparatus and method. Using a number of punching and forming tools material portions are punched from a sheet material. The size of these material portions, indicated by circles 10.1 . . . 10.10 (plus the width of the punching tool and additional elements required extending outside of the footprint of the material portions) defines a certain minimal footprint of the punching and forming tools. In order to reduce the width of the apparatus, the punching and forming tools are arranged in a staggered pattern, along two lines perpendicular to the work flow direction. This allows for almost halving the required width, especially in cases where a rather large number of punching and forming tools are employed.

The footprint of the formed filters is much smaller than that of the flat punched material portions. In typical cases, the diameter of the filter will be a third of the diameter of the material portion or even less. Accordingly, the insertion tools require a much smaller footprint, indicated by circles 20.1 . . . 20.10. Due to this, the insertion tools may be arranged along a straight line, a staggered pattern is not required. Accordingly, the filters formed in five of the punching and forming tools 10.1, 10.3, 10.5, 10.7, 10.9 will be transported along the work flow direction by a larger distance than the filters formed in the other punching and forming tools 10.2, 10.4, 10.6, 10.8, 10.10, as indicated by the arrows.

The FIG. 1B shows a variant of FIG. 1A, in which insertion tools are not only provided for downstream of the punching and forming stations but also upstream of them. The corresponding footprints, indicated by circles 21.1 . . . 21.10 correspond to those of the downstream stations. Formed filters may be fed to either the insertion station arranged upstream of the punching and forming station or the insertion station arranged downstream of the punching and forming station. Alternately employing the downstream and the upstream insertion station thus allows for increasing the throughput of the entire system as the capacity of insertion is doubled. The general layout shown in FIG. 1B corresponds to that of the embodiment described in connection with the following Figures.

Figure 2A:
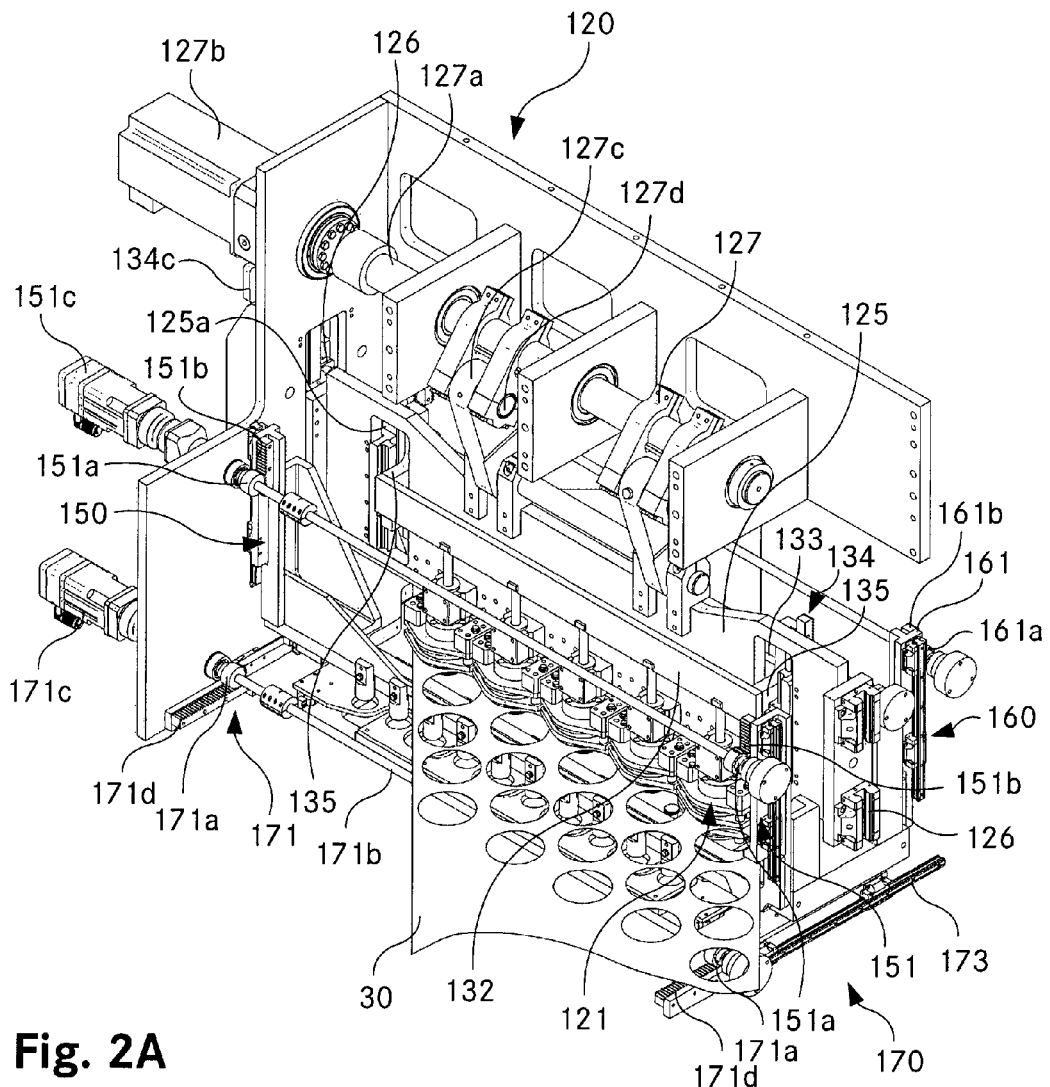
FIG. 2A, B a perspective view and a sliced side view of an embodiment of the apparatus according to the invention.
Figure 2B:
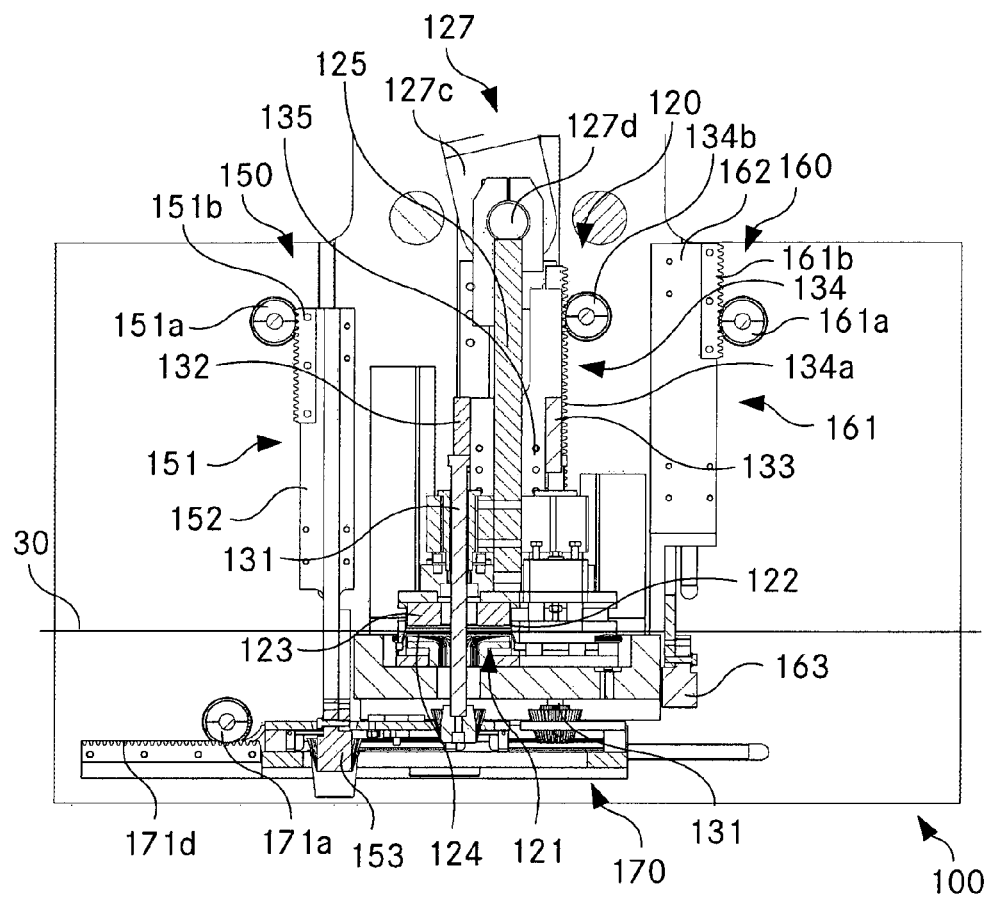

The FIG. 2A shows a perspective view of the main components of an embodiment of the apparatus according to the invention. The FIG. 2B shows a sliced side view in a vertical plane including the work flow direction. The apparatus 100 comprises a punching and forming station 120, a first insertion station 150 upstream of the punching and forming station 120, a second insertion station 160 downstream of the punching and forming station 120 and a transport mechanism 170.

The punching and forming station 120 comprises ten punching and forming devices 121 arranged in a staggered pattern as shown in FIG. 1. The punching and forming devices 121 comprise a punching tool 122 including a movable die 123 with a knife and a fixed matrix 124 as well as a central plunger 131 which is movable independently of the die 123. The lower end of the plunger 131 features a punch having the shape of a cylinder with a slightly convex skin surface. The end face of the punch is circular, the diameter corresponding to the diameter of the base of the beaker-shaped filters to be formed.

A main support plate 125 extends over the whole width of the station, its main surfaces are vertical. The main support plate 125 is vertically movable, guided on two vertical tracks 126 arranged on both sides of the main support plate 125. Movement of the main support plate 125 is effected by a knee-lever mechanism 127, including a drive axis 127a driven by a motor 127b. The drive axis 127a is coupled to the first end of three knee levers 127c, whereas the second end of the knee levers 127c is coupled to a further axis 127d which is rotatably supported on the main support plate 125. Rotating the drive axis 127a by about 30° allows for moving the main support plate 125 along the vertical tracks 126. The movable dies 123 of all the forming devices 121 are fixed to the main support plate 125, therefore they may be operated by means of the motor 127b and the knee-lever mechanism 127. The knee-lever mechanism 127 ensures the transmission of maximum force in the punching position of the die 123.

Two control plates 132, 133 as well extend over the whole width of the station, having vertical surfaces and being vertically movable, independent from the main support plate 125, guided on further vertical tracks. One of the two control plates 132 is arranged on a first side of the main support plate 125, the other of the control plates 133 is arranged on the other side of the main support plate 125. At their top ends the plungers 131 comprise a flanged portion cooperating with corresponding recesses of the respective control plate 132, 133. Movement of the control plates 132, 133 is driven by a rack-and-pinion drive 134, including two racks 134a arranged on both sides of the device, driven by respective pinions 134b, whereas the pinions are driven by a further motor 134c. The racks 134a are attached to transmitter plates 135, their main surfaces extending in the work flow direction. Both control plates 132, 133 are attached to both the transmitter plates 135. A portion of the transmitter plates 135 attached to the control plate 132 on the side of the main support plate 125 opposite the rack-and-pinion drive 134 traverses openings 125a of the main support plate 125 in order to ensure independent vertical mobility.

The insertion stations 150, 160 each comprise a rack-and-pinion drive 151, 161 comprising two pinions 151a, 161a each cooperating with two racks 151b, 161b each. The pinions 151a, 161a are driven by further motors 151 c. The racks 151b, 161b are attached to side plates 152, 162 which are again guided on vertical tracks. Further, insertion tools 153, 163 are attached to cross plates linking the side plates 152, 162. The arrangement of the insertion tools 153, 163 with respect to the punching and forming tools is as shown in FIG. 1B. The insertion tools have the shape of a cylinder, the diameter of which corresponding to the base of the beaker-shaped filters.

A sheet 30 of filter material is fed between the dies 123 and the matrices 124 of the punching and forming devices 121. The sheet 30 is fed in a direction angled to the work flow direction of the apparatus as this allows for better exploitation of the filter material.

Figure 3A:
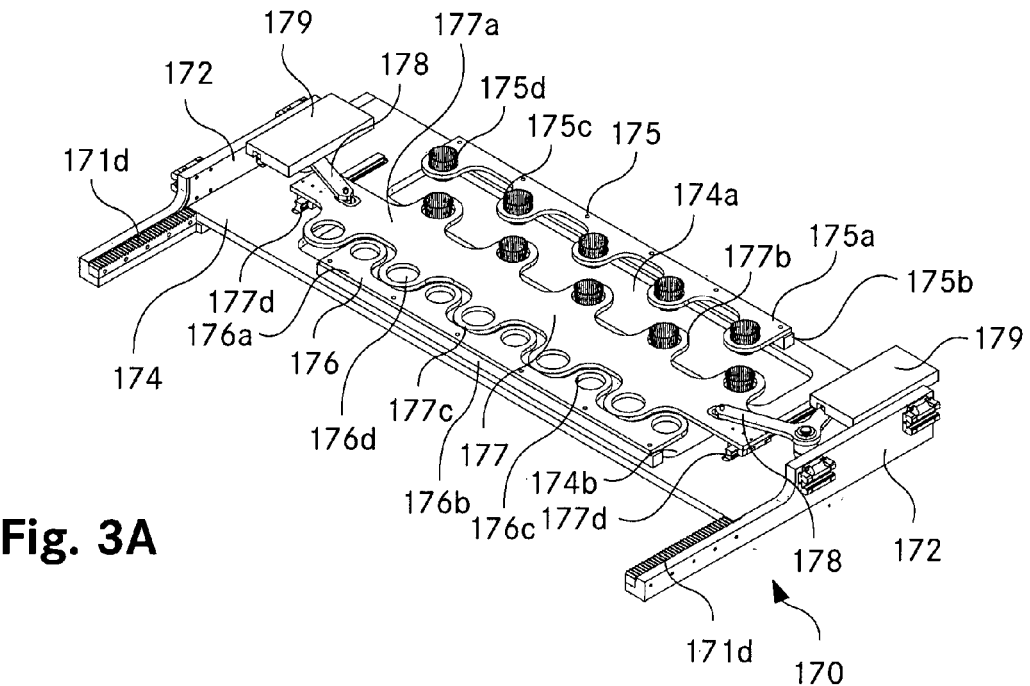
FIG. 3A, B perspective views of the transport mechanism of the apparatus in two phases of operation.
Figure 3B:
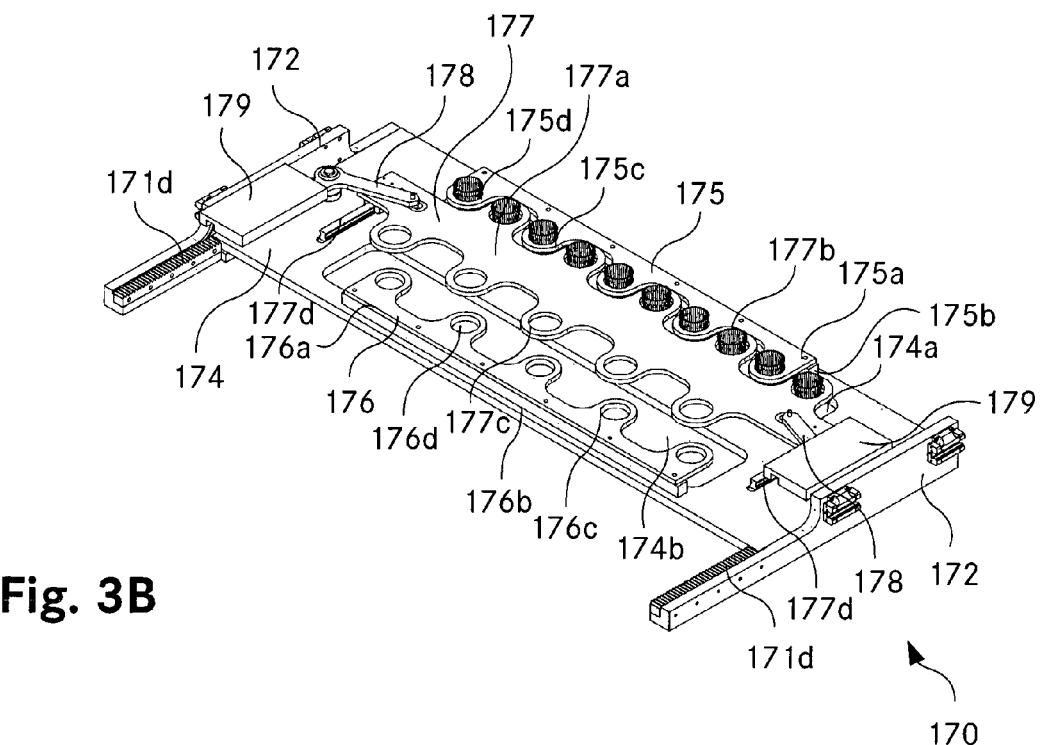

The FIGS. 3A, 3B are perspective views of the transport mechanism 170 of the apparatus in two phases of operation. The transport mechanism 170 comprises a rack-and-pinion drive 171, including two pinions 171a arranged on both sides of the apparatus, connected by an axis 171b and driven by a further motor 171c (see FIG. 2A, 2B). The pinions 171a drive corresponding racks 171d attached to extensions of side plates 172 of the transport mechanism 170. The side plates 172 are guided on linear tracks 173 extending horizontally, along the work flow direction (see FIG. 2A). Attached between the side plates 172 is a base plate 174, its main surfaces extending in horizontal planes. The base plate 174 comprises two oblong openings 174a, 174b extending over the work area of the apparatus when the transport mechanism 170 is installed. A first horizontal holding plate 175 cooperates with the first opening 174a, a second horizontal holding plate 176 cooperates with the second opening 174b. Both the holding plates 175, 176 comprise a base portion 175a, 176a firmly attached to the base plate 174, whereas spacers 175b, 176b are sandwiched between the holding plates 175, 176 and the base plate 174. The holding plates 175, 176 further feature 5 seat portions 175c, 176c each, extending from the base portions 175a, 176a. The seat portions 175c, 176c comprise circular bores 175d, 176d the dimensions of which being adapted to the dimensions of the formed filters in such a way that the filters partly inserted into the bores 175d, 176d are held in the respective bores with their slightly conical lateral surfaces due to the elasticity of the filter material. The positions of the seats of the two holding plates 175, 176 are staggered with respect to each other.

The transport mechanism 170 further comprises a movable holding plate 177 comprising a central portion 177a and 5 seat portions 177b, 177c both in work flow direction as well as against the work flow direction, i. e. in front of as well as behind the central portion 177a. The dimension of the seats is exactly as those of the seats of the holding plates 175, 176 fixed to the base plate 174. They are arranged in a staggered relationship, in such a way that the seat portions 177b facing the seat portions 175c of the frontal holding plate 175 may cooperate with the latter seat portions 175c, whereas the seat portions 177c facing the seat portions 176c of the rear holding plate 176 may cooperate with the latter seat portions 176c. The central portion 177a of the movable holding plate 177 is guided by two linear guides 177d and connected to a first limb of two levers 178 near both its lateral ends. The levers 178 each comprise a cam attached to a further limb of the levers 178 opposite of a swivel axis of the levers 178. The cams cooperate with fixed slots 179 in such a way that the movable holding plate 177 is moved into the first position shown in FIG. 3A when the base plate 174 is in the rearmost position. In the first position, the rear seat portions 177c cooperate with the seat portions 176c of the rear holding plate 176. When the base plate 174 is in the foremost position, the movable holding plate 177 is moved into the second position shown in FIG. 3B, where the front seat portions 177b cooperate with the seat portions 175c of the front holding plate 175. In both positions, the cooperating seat portions are arranged in a straight line oriented perpendicular to the work flow direction. The seats are arranged in a region where they are uncovered by the base plate 174 due to the oblong openings 174a, 174b of the base plate 174.

The FIGS. 4A-F show sliced side views of the apparatus in successive phases of operation. In the situation shown in FIG. 4A, filters have already been positioned during previous steps within the circular bores 175d of seat portions 175c, 177b of the frontal (first) horizontal holding plate 175 and the front section of the movable holding plate 177.

The transport mechanism 170 is essentially in the position shown in FIG. 3A and moved to its rearmost position with respect to the forming and insertion device. All insertion tools 153, 163 of the two insertion stations 150, 160 are in their uppermost position.

All the dies 123 and the matrices 124 of the punching and forming devices 121 are in an open position with respect to one another, the matrices 124 are empty. The knee-lever mechanism 127 is in its upper position, i. e. where the main support plate 125 for the dies 123 is in its upper position. The rack-and-pinion drive 134 is in its uppermost position, where the plungers 131 coupled to the drive are retracted behind the dies 123.

Figures 4A, 4B:
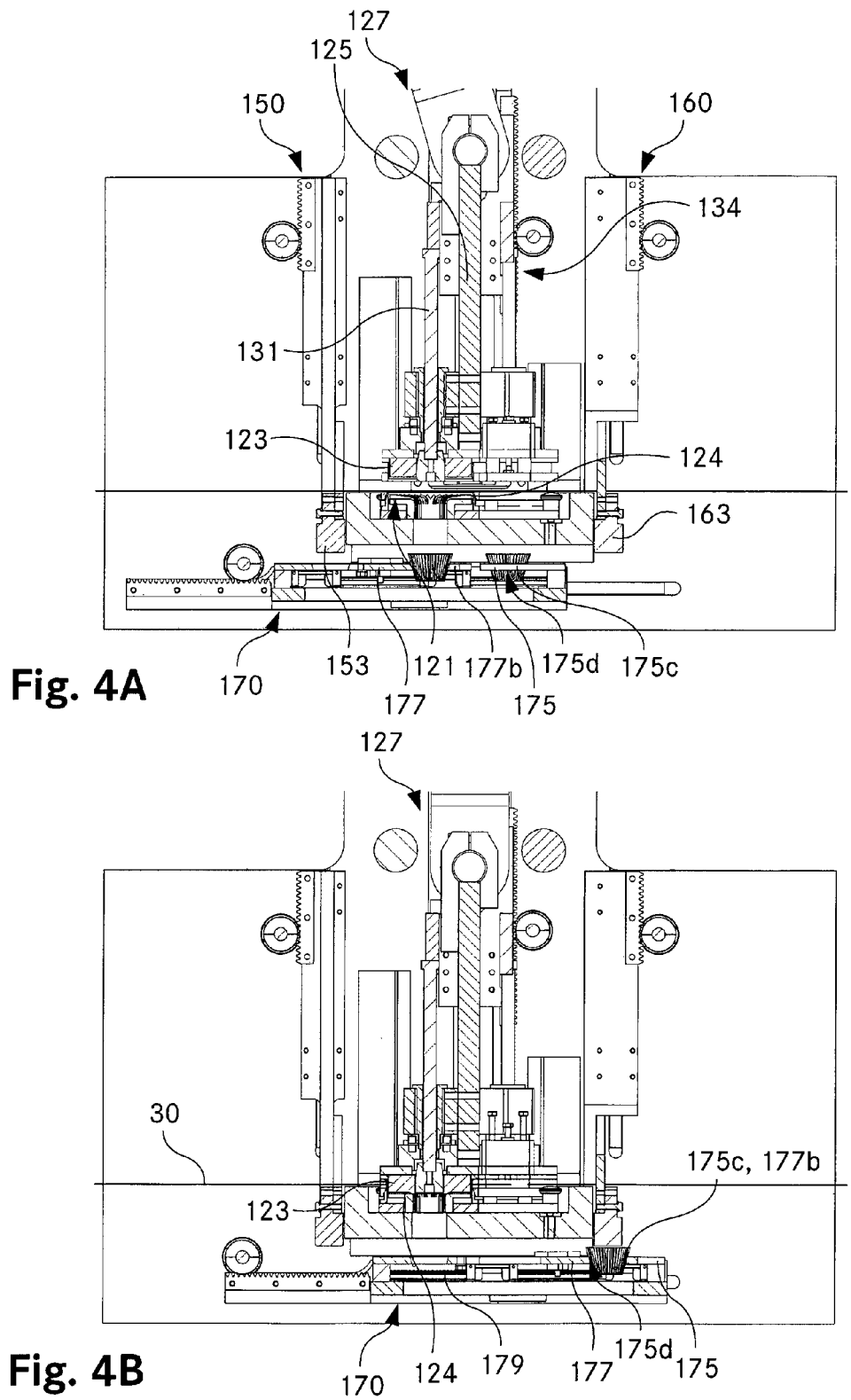
FIG. 4A-F sliced side views of the apparatus in successive phases of operation.

Next, the knee-lever mechanism 127 is lowered by actuating the respective motor 127b (see FIG. 2A). Thereby, the dies 123 are lowered onto the respective matrices 124 to cut out circular portions of the sheet 30 of filter material. Initially the cut out portions are held between the dies 123 and the matrices 124, as shown in FIG. 4B.

Simultaneously with lowering the knee-lever mechanism 127 the transport mechanism 170 is moved to its foremost position by actuating the corresponding motor 171c (see FIG. 2A). Due to cooperation of the fixed slots 179 with the cams of the levers 178 (see FIG. 3A) the movement of the transport mechanism 170 automatically leads to movement of the movable holding plate 177 in a position where the circular bores 175d of seat portions 175c, 177b of the frontal (first) horizontal holding plate 175 and the front section of the movable holding plate 177 are arranged in one line, i. e. the situation shown in FIG. 3B.

Figure 4C:
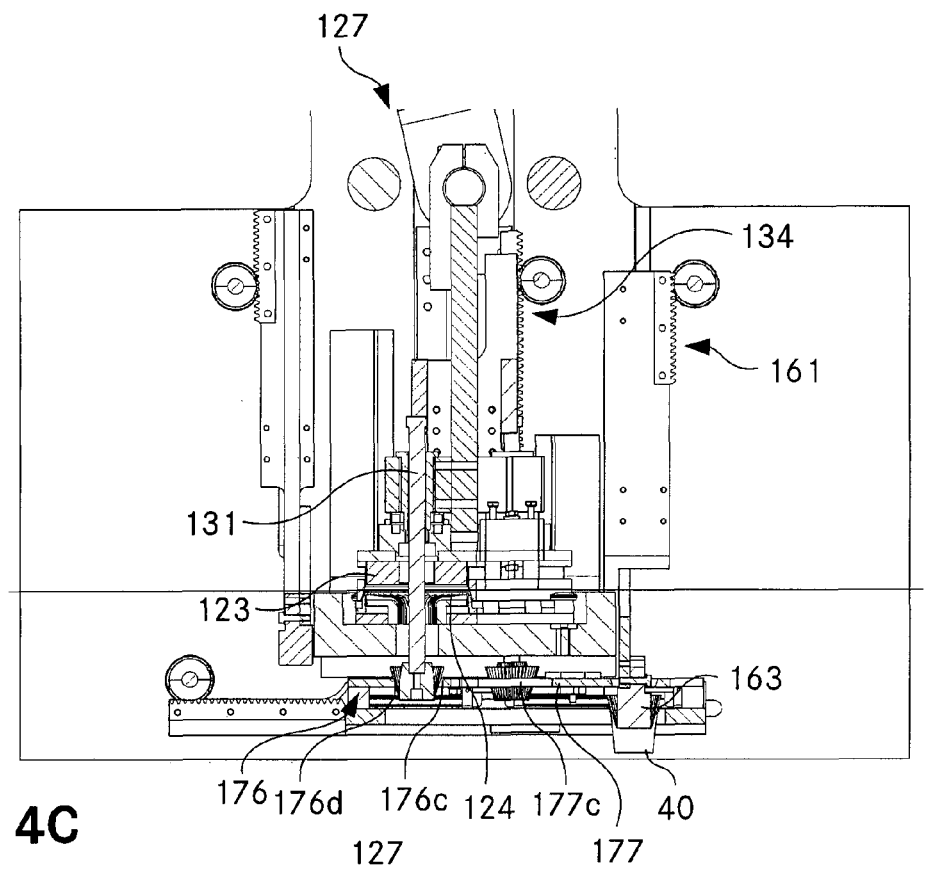
Figure 4D:
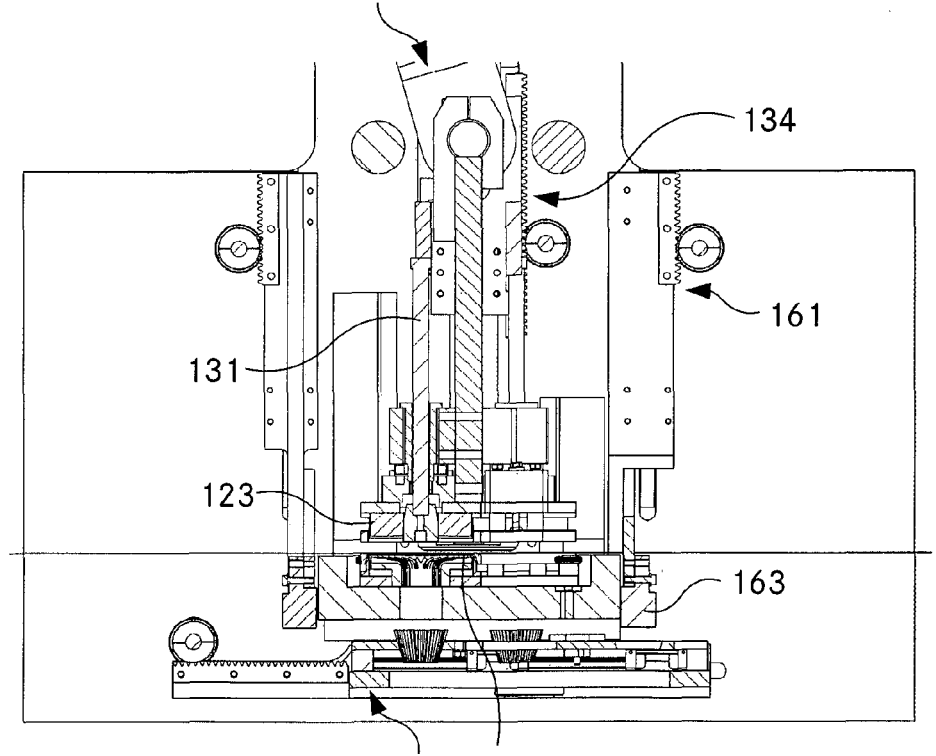

In a further step, the plungers 131 are lowered by the corresponding rack-and-pinion drive 134 actuated by the respective motor 134c (see FIG. 2A). At the same time, the dies 123 and the matrices 124 are separated from each other by actuating the motor 127b (see FIG. 2A) coupled to the knee-lever mechanism 127. This allows for the plungers 131 pushing the material portion into the matrix 124, thereby forming a beaker-shaped filter with a creased side wall. The plungers 131 are lowered until the beaker-shaped filters are securely held in the corresponding circular bores 176d of seat portions 176c, 177c of the rear (second) horizontal holding plate 176 and the rear section of the movable holding plate 177. Furthermore, driven by rack-and-pinion drive 161, the front insertion tools 163 are lowered to engage with the beaker-shaped filters held in the corresponding seats of the transport mechanism 170 and to push the beaker-shaped filters into a row of capsules 40 positioned below the seats by a capsule feeder 50 known as such. The resulting situation is shown in FIG. 4C.

Next, the insertion tools 163 are retracted, driven by the corresponding rack-and-pinion drive 161. The dies 123 and the matrices 124 are further separated from each other into their fully open position by further actuating the motor 127b (see FIG. 2A) coupled to the knee-lever mechanism 127. At the same time, the plungers 131 are retracted to their uppermost position by the respective rack-and-pinion drive 134. The corresponding position, shown in FIG. 4D, essentially corresponds to the one shown in FIG. 4A, with the exception that formed filters are held in the rear seats of the transport mechanism 170 instead of in the front seats. Accordingly, the transport mechanism 170 is in its foremost instead of in its rearmost position.

Next, the knee-lever mechanism 127 is lowered by actuating the respective motor 127b (see FIG. 2A). Thereby, the dies 123 are lowered onto the respective matrices 124 to cut out circular portions of the sheet 30 of filter material.

Figure 4E:
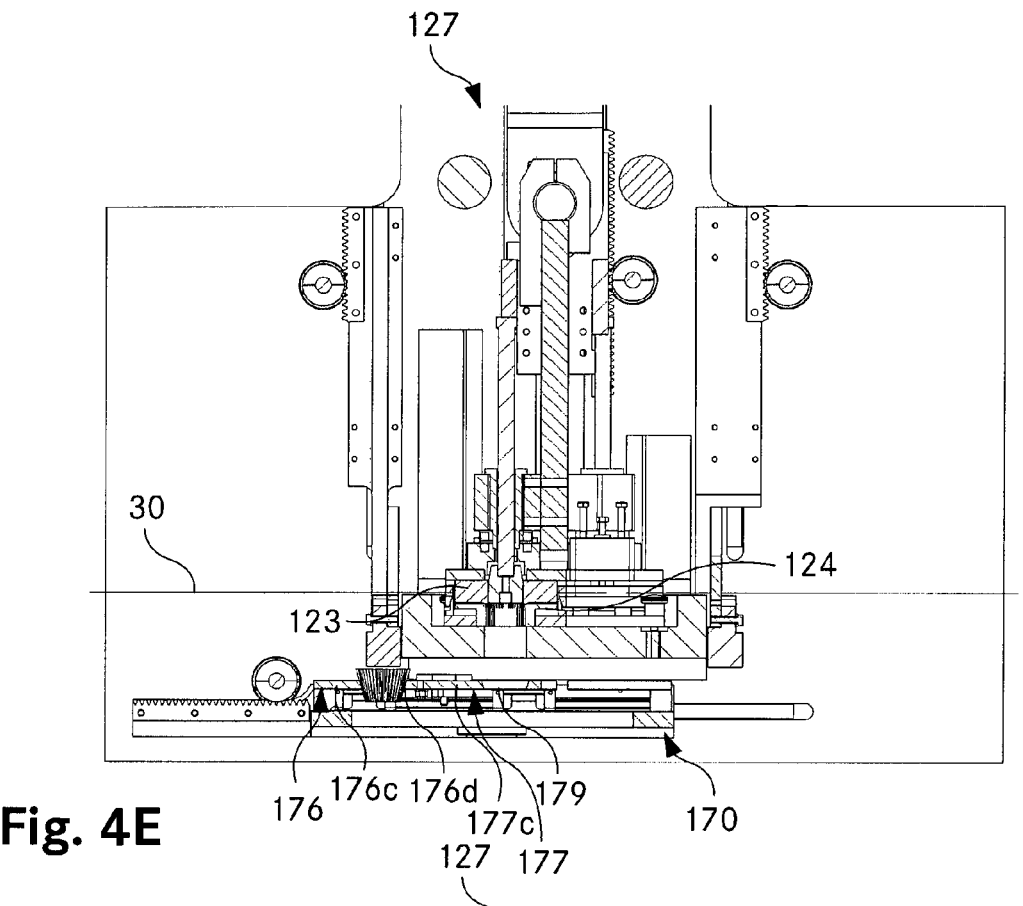
Figure 4F:
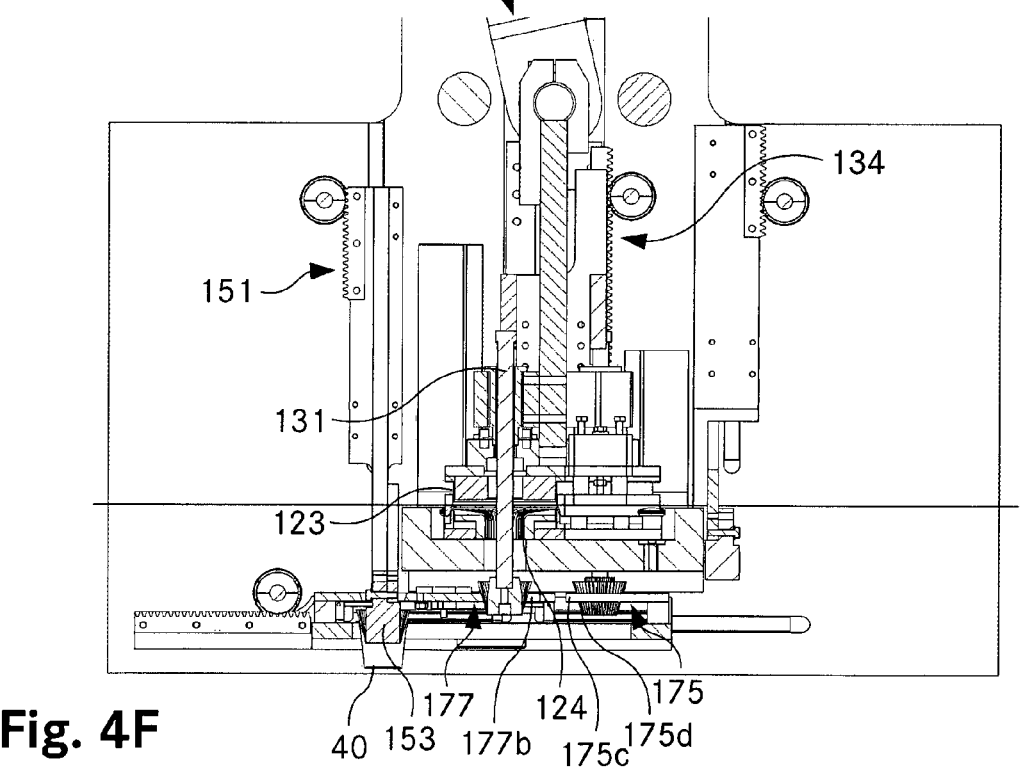

Initially the cut out portions are held between the dies 123 and the matrices 124, as shown in FIG. 4E.

Simultaneously with lowering the knee-lever mechanism 127 the transport mechanism 170 is moved to its rearmost position by actuating the corresponding motor 171c (see FIG. 2A. Due to cooperation of the fixed slots 179 with the cams of the levers 178 (see FIG. 3A) the movement of the transport mechanism 170 automatically leads to movement of the movable holding plate 177 in a position where the circular bores 176d of seat portions 176c, 177c of the rear (second) horizontal holding plate 176 and the rear section of the movable holding plate 177 are arranged in one line, i. e. the situation shown in FIG. 3A.

In a further step, the plungers 131 are lowered by the corresponding rack-and-pinion drive 134 actuated by the respective motor 134c (see FIG. 2A). At the same time, the dies 123 and the matrices 124 are separated from each other by actuating the motor 127b (see FIG. 2A) coupled to the knee-lever mechanism 127. This allows for the plungers 131 pushing the material portion into the matrix 124, thereby forming a beaker-shaped filter with a creased side wall. The plungers 131 are lowered until the beaker-shaped filters are securely held in the corresponding circular bores 175d of seat portions 175c, 177b of the frontal (first) horizontal holding plate 175 and the front section of the movable holding plate 177. Furthermore, driven by rack-and-pinion drive 151, the rear insertion tools 153 are lowered to engage with the beaker-shaped filters held in the corresponding seats of the transport mechanism 170 and to push the beaker-shaped filters into a row of capsules 40 positioned below the seats by a capsule feeder known as such.

After retraction of the insertion tools 153, further separating the dies 123 and the matrices 124 from each other into their fully open position and retracting the plungers 131 to their uppermost position essentially the situation shown in FIG. 4A is reached and another work cycle may follow.

The invention is not restricted to the described preferred embodiment. The number, geometry and arrangement of the tools may be chosen differently and other means for driving the movements of the components may be employed. Components such as the plungers, the seats of the transport device, the die and the matrix, the insertion tools, etc., may be designed differently in order to be adapted to the geometry of the filters and capsules.

In summary, it is to be noted that the invention creates an apparatus and a method for manufacturing filters and inserting the filters into single dose capsules for preparing beverages that has a small footprint, is of simple construction and allows for high throughput.

The invention claimed is:

1. An apparatus for manufacturing filters and inserting the filters into single dose capsules for preparing beverages, comprising:
   a) a punching and forming device for punching material portions from a sheet material and forming the material portions to assume the form of beaker-shaped filters, the punching and forming device including a plurality of punching and forming tools, the work positions of neighboring punching and forming tools being arranged in a first distance to each other;
   b) an insertion device arranged in a distance of the punching and forming device along a work flow direction for inserting the formed filters into the capsules, the insertion device including a plurality of insertion tools, the work positions of neighboring insertion tools being arranged in a second distance to each other;
   c) a first transport device for accepting a plurality of formed filters from the punching and forming device and transporting the accepted filters to the insertion device;
   d) a second transport device for accepting a plurality of formed filters from the punching and forming device and transporting the accepted filters to the insertion device; wherein
   the first transport device and the second transport device are movable with respect to each other, and the second distance is smaller than the first distance,
   the work positions of the plurality of punching and forming tools are arranged along two straight lines, the lines being spaced with respect to the work flow direction, whereas the work position of the punching and forming tools are alternately arranged on a first and on a second of the two lines, and
   the work positions of the plurality of insertion tools are arranged along a straight line, an insertion tool assigned to each of the punching and forming tools, the work position of the assigned insertion tool being arranged in the work flow direction with respect to the work position of the respective punching and forming tool.

2. The apparatus as recited in claim 1, wherein the first transport device and the second transport device each comprise a plurality of seats for the acceptance of a formed filter each, whereas the seats of the first transport device and the seats of the second transport device are offset to each other along a line perpendicular to the work flow direction.

3. The apparatus as recited in claim 2, wherein the seats of the first transport device and the seats of the second transport device are arranged in portions of transport elements that may be brought into a teethed relationship.

4. The apparatus as recited in claim 3, wherein the transport elements of the first transport device and the second transport device are formed such that they may be brought into the teethed relationship such that the seats are arranged along a straight line.

5. The apparatus as recited in claim 1, further comprising:
   a second insertion device, one of the insertion devices being arranged upstream of the punching and forming device with respect to the work flow direction, the other of the insertion devices being arranged downstream of the punching and forming device with respect to the work flow direction.

6. The apparatus as recited in claim 5, further comprising:
   a third transport device being movable with respect to at least one of the first and second transport devices.

7. The apparatus as recited in claim 6, wherein the first and the third transport devices being fixedly attached to a base, wherein the base is movable in the work flow direction, the second transport device being mounted on the base, movable with respect to the base and in a position between the first and third transport device with respect to the work flow direction.

8. The apparatus as recited in claim 1, wherein the punching and forming device comprises a punching tool being movable in a punching and forming direction and a plunger coaxially arranged in the center of the punching tool, being movable in the punching and forming direction with respect to the punching tool.

9. The apparatus as recited in claim 8, further comprising:
   a forming tool being arranged downstream of the punching tool in the punching and forming direction, wherein the plunger forces the punched material portion through the forming tool, thereby forming the material portion to assume the form of a beaker-shaped filter, whereas the plunger further transports the formed filter into one of the transport devices.

\* \* \* \* \*